Patented Sept. 7, 1937

2,092,431

UNITED STATES PATENT OFFICE 2,092,431

PROCESS FOR THE PRODUCTION OF METHYL AMINES

Lloyd C. Swallen and Jerome Martin, Terre Haute, Ind., assignors to Commercial Solvents Corporation, Terre Haute, Ind., a corporation of Maryland No Drawing. Application December 24, 1931, Serial No. 583,136

6 Claims. (Cl. 260—127)

The present invention relates to the production of higher methyl amines from lower methyl amines. More specifically, the present invention relates to the production of di-methyl amine from mono-methyl amine and methanol and the production of tri-methyl amine from mono-methyl amine or di-methyl amine and methanol.

In the past, methyl amines have been prepared synthetically by a number of different methods, among which is the process of using ammonia and methanol as the reactants. According to this process, ammonia and methanol vapor are passed over dehydrating catalysts or amination catalysts at elevated temperatures. According to this method, a mixture of mono-, di- and tri-methyl amines is obtained and it has been found to be practically impossible to obtain only a single amine as the product. It has been attempted to secure a predominance of the desired amine by varying the ratio of the reactants and by including the undesired amines in the reactant mixture. However, these procedures have certain inherent disadvantages, for example, the low conversion per unit of gas passed over the catalyst. It is therefore apparent that it would be desirable to carry out the reaction under conditions allowing the highest conversion and to secure the desired amine from the undesired amines produced in the reaction.

The production of higher amines from lower amines in the case of alkyl amines higher in the series than methyl amines has been investigated and passed. For example, Sabatier and Mailhe (Compt. Rendus 1912, 155, 385) have disclosed the preparation of di-propyl amine from propyl amine and propyl alcohol in the catalytic synthesis of propyl amines from propyl alcohol and ammonia over heated thoria at temperatures between 250 and 350° C. However, in the case of the methyl amines, the reaction of lower amines with methanol has been found to take place only to a negligible degree under the conditions specified by the prior investigators.

It has now been found that if high temperatures are employed, satisfactory conversions of the lower amines to the higher amines may be obtained according to the following reactions:

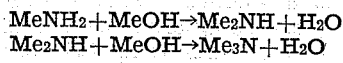
$$MeNH_2 + MeOH \rightarrow Me_2NH + H_2O$$
$$Me_2NH + MeOH \rightarrow Me_3N + H_2O$$

These reactions may be carried out at temperatures from 375 to 500° C., but preferably between 425 and 475° C. Space velocities (c. c. of gas mixture, measured under standard conditions, per c. c. of catalyst per hour) between 50 and 5000 may be employed, but it is preferred to operate at space velocities between 500 and 1500. Although increased or decreased pressures may be employed, it is preferred to operate at atmospheric pressure or moderately increased pressure.

The relative amounts of di- and tri-methyl amines produced from mono-methyl amine and methanol will be found to depend upon the temperature and the ratio of methanol to amines in the reaction mixture. At lower temperatures, less of the methanol goes to tri-methyl amine and at higher temperatures more tri-methyl amine will be formed. However, it has been found to be impractical to reduce the temperature to too great an extent with the view of reducing the amount of tri-methyl amine formed since at lower temperatures the amount of methanol which reacts to form either of the higher amines is greatly reduced. The ratio of methanol to amines may be varied at will, but from a practical standpoint, it has been found to be preferable to keep the ratio between 1:5 and 5:1. Thus, if tri-methyl amine is the preferred product, a ratio of five parts of methanol to one part of amines may be employed and if di-methyl amine is the preferred product, a ratio of one part of methanol to five parts of amines may be employed. Since, however, these ratios are much in excess of the molecular proportions required for the reactions, it is preferred, in most cases, to use ratios between 2:1 and 1:2.

Small amounts of water in the reacting mixture may have a slight tendency to reverse the reaction and thus reduce the conversion to higher amines, but under the conditions employed, this effect has been found to be negligible. It has therefore been found to be unnecessary to employ anhydrous methanol. Commercial grades of methanol such as 90% methanol, have been found to be quite suitable.

The catalysts which may be employed are dehydrating catalysts or amination catalysts such as alumina, partially dehydrated aluminum trihydrate, aluminum silicate, Blue clay, Doucil, Putnum clay, Indianaite, feldspar, blue oxide of tungsten, chromic oxide, silica, thoria, titania, etc. Of these, it is preferred to use aluminum silicate or the partially dehydrated aluminum trihydrate, but it is to be understood that any amination catalyst may be employed.

It is to be understood that the present invention is applicable to mixtures of amines as well as to pure mono-methyl amine or di-methyl amine. For example, in the separation of mono-, di- and tri-methyl amines by distillation methods, fractions are obtained containing high proportions of mono-methyl amine and lower proportions of di-methyl amine and/or tri-methyl amine. It has been found that such mixtures are eminently suited for use in the present invention. A fraction which is commonly obtained and which has been found to be especially satisfactory for use in the present invention is one containing about 87% mono-methyl amine and 13% tri-methyl amine. Any tri-methyl amine which may be in the mixture, may, of course, have a tendency to reverse the reaction and thus reduce the conversion of mono- or di-methyl amine to tri-methyl amine. However, under the conditions employed, this effect is not pronounced and it has been found to be unnecessary to separate the tri-methyl amine from the reactant mixture. However, if di-methyl amine is the desired product, it is preferable to remove any of this material from the reactant mixture owing to the fact that it will react to some extent with methanol to form tri-methyl amine even at relatively low temperatures and with low concentrations of methanol in the reactant mixture.

The invention may best be illustrated by the following specific example: A measured amount of 90% methanol is introduced into a feed tank. The fraction of liquid amines containing about 87% mono-methyl amine and 13% tri-methyl amine which is obtained in the separation of mono-, di- and tri-methyl amines by distillation methods is then conducted under its own pressure to the feed tank where the mixture is brought to a methanol/amine ratio of 1:2. The mixture is then sent through a regulating valve and flowmeter, where the space velocity is adjusted to about 1300, into a steam jacketed vaporizer and thence to a direct fired preheater where it is heated to a temperature somewhat below the reaction temperature. The mixture is then passed over a catalyst consisting of partially dehydrated aluminum trihydrate which is maintained at a temperature such that the hottest part of the catalyst mass is maintained at about 450° C. The gases leaving the catalyst are then passed through an air-cooled pipe, a strainer to remove particles of entrained catalyst and a water-jacketed pipe which cools the gas to about 20–40° C. and removes the water formed in the reaction and other material condensable at such temperatures. The gas mixture leaving the catalyst is found to consist of about 60% mono-methyl amine, 20% di-methyl amine and 20% tri-methyl amine. This mixture may be sent to storage tanks or may be sent directly to distillation apparatus where it is separated into its constituents by any of the known means.

The following table will illustrate the results obtained when carrying out the reaction with various reaction mixtures and under various conditions using partially dehydrated aluminum trihydrate as the catalyst:

Table

| Ratio of mols amines to mols MeOH | Composition of amines—mol. % | Temp. °C. | S. V. | % mono amine reacted—(calc'd) | Composition of product—mol. % | | |
|---|---|---|---|---|---|---|---|
| | | | | | $MeNH_2$ | $Me_2NH$ | $Me_3N$ |
| 2.0 | 100% mono | 450 | 1300 | 35.8 | 64.2 | 26.4 | 9.4 |
| 0.5 | 100% mono | 450 | 1300 | 83.6 | 16.4 | 23.6 | 60.0 |
| 2.12 | 87% mono / 13% tri | 400 | 1300 | 20.0 | 67.0 | 18.3 | 14.7 |
| 1.94 | 87% mono / 13% tri | 425 | 1300 | 25.5 | 61.5 | 23.2 | 15.3 |
| 2.27 | 87% mono / 13% tri | 450 | 1300 | 29.5 | 57.5 | 20.6 | 21.9 |
| 2.22 | 87% mono / 13% tri | 475 | 1300 | 32.0 | 55.0 | 18.4 | 26.6 |
| 2.15 | 75% mono / 10% di / 15% tri | 450 | 970 | 26.0 | 49.0 | 22.0 | 29.0 |
| 2.01 | 75% mono / 10% di / 15% tri | 450 | 940 | 28.3 | 46.7 | 21.5 | 31.8 |
| 1.81 | 75% mono / 10% di / 15% tri | 450 | 840 | 32.5 | 42.5 | 26.7 | 30.8 |

It is to be understood that the present invention is not to be limited to the particular mixtures, catalysts or operating conditions employed in the above examples, but that known equivalents may be employed and the procedure may be modified in any way which would naturally occur to one skilled in the art.

The invention now having been described, what is claimed is:

1. A process for the production of tri-methyl amine which comprises passing a gaseous mixture containing methanol and a methyl amine of the group consisting of mono- and di-methyl amines over metal oxide dehydrating catalysts at temperatures from approximately 375° C. to approximately 500° C.

2. A process for the production of tri-methyl amine which comprises passing a gaseous mixture containing methanol and a methyl amine of the group consisting of mono- and di-methyl amines at temperatures from 425–475° C. over metal oxide dehydrating catalysts.

3. A process for the production of tri-methyl amine which comprises passing a gaseous mixture containing methanol and a methyl amine of the group consisting of mono- and di-methyl amines over dehydrated aluminum trihydrate at temperatures from approximately 375° C. to approximately 500° C.

4. A process for the production of tri-methyl amine which comprises passing a gaseous mixture containing methanol and a methyl amine of the group consisting of mono- and di-methyl amines at temperatures from 425–475° C. over dehydrated aluminum trihydrate.

5. A process for the production of tri-methyl amine which comprises passing a gaseous mixture containing methanol and a methyl amine of the group consisting of mono- and di-methyl amines over aluminum silicate at temperatures from approximately 375° C. to approximately 500° C.

6. A process for the production of tri-methyl amine which comprises passing a gaseous mixture containing methanol and a methyl amine of the group consisting of mono- and di-methyl amines at temperatures from 425–475° C. over aluminum silicate.

LLOYD C. SWALLEN.
JEROME MARTIN.